E. R. KNIGHT.
PLOW.
No. 174,423.  Patented March 7, 1876
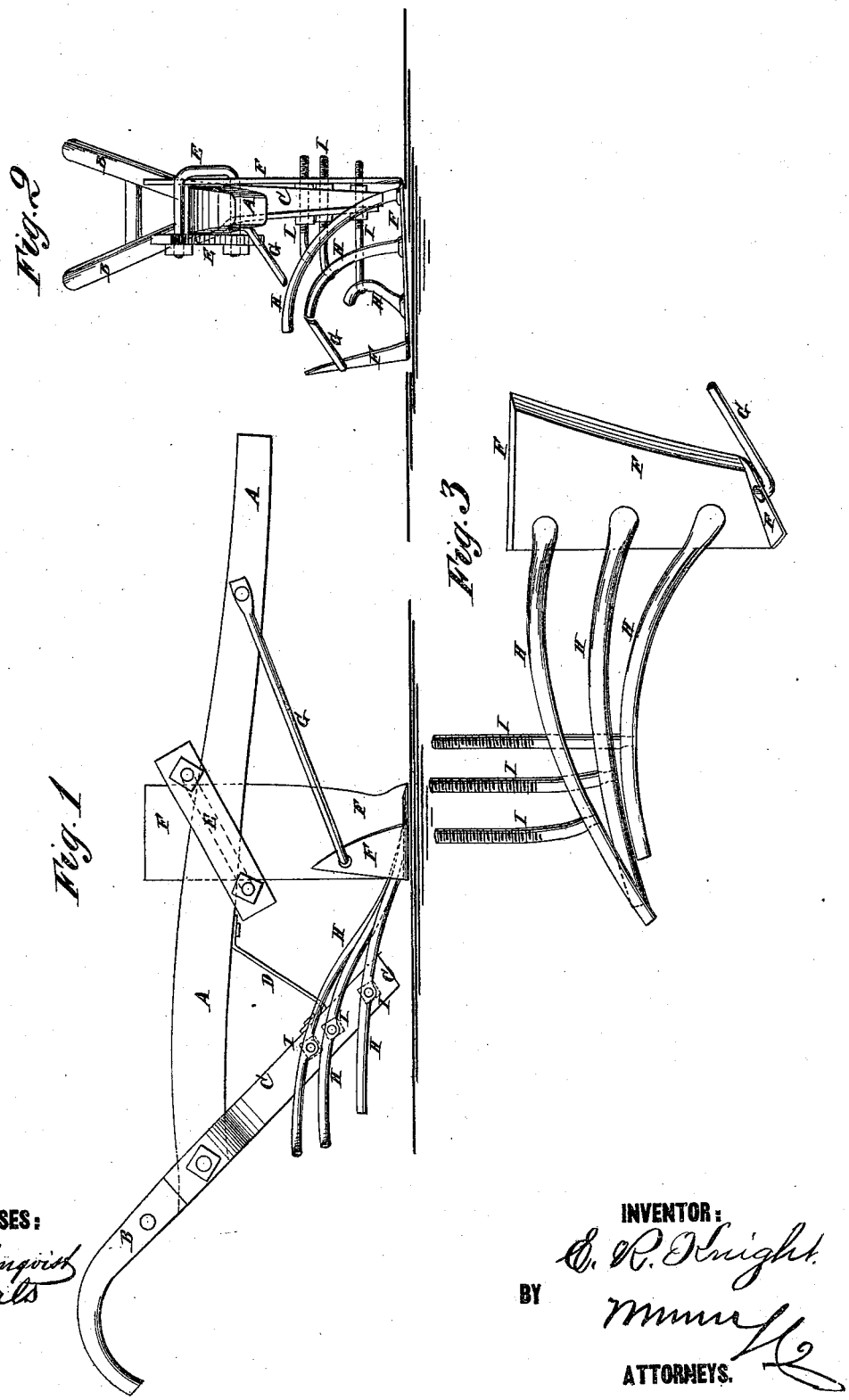

UNITED STATES PATENT OFFICE.

EUGENE R. KNIGHT, OF OMAHA, NEBRASKA.

IMPROVEMENT IN PLOWS.

Specification forming part of Letters Patent No. 174,423, dated March 7, 1876; application filed December 27, 1875.

*To all whom it may concern:*

Be it known that I, EUGENE R. KNIGHT, of Omaha, in the county of Douglass and State of Nebraska, have invented a new and useful Improvement in Breaking-Up Plow, of which the following is a specification:

Figure 1 is a side view of my improved plow. Fig. 2 is a front view of the same. Fig. 3 is a top view of the same, the beam-handles and arm being removed.

Similar letters of reference indicate corresponding parts.

The object of this invention is to furnish an improved breaking-up plow, simple in construction and effective in operation, and which shall be of a much lighter draft than ordinary plows.

The invention consists in the application of a colter, bent horizontally to the width of furrow, and turned up at the outer end to a mold-board made of rods, all as hereinafter described.

A is the plow-beam, to the rear end of which are attached the handles B. To the rear end of the beam A is also attached an arm, C, which may be a downward extension of one of the handles B, and the draft-strain upon which is sustained by an inclined brace, D, attached to it and to the beam A.

To the middle part of the beam A is secured by a bow and yoke, E, or other suitable means, a wide and thin plate, F, the forward edge of which is made sharp to adapt it to serve as a colter. The lower part of the plate F is bent outward at right angles, extends outward for the width of the furrow, and its outer end is bent upward at an angle a little greater than a right angle, and to it is attached a brace, G, the forward end of which is attached to the forward part of the beam A, and which is designed to support the draft-strain upon the plate F.

To the horizontal part of the plate F, near its rear edge, is attached the forward ends of three or more rods, H, which extend to the rearward, and are so curved as to give them the general form of a mold-board.

To the rear part of each of the rods H is attached the outer end of a rod, I, which passes through the arm C and has a screw-thread cut upon it to receive two nuts, which are placed one upon each side of the said arm C, so that the position of each of the rods H may be adjusted independent of the others. By this construction the sod will be cut and turned properly with a much less outlay of power than is required when an ordinary plow is used.

Having thus described my invention, I claim as new, and desire to secure by Letters Patent—

The combination, in a sod-breaking plow with mold-board arms H, of colter-share F, bent the width of furrow in a horizontal plane and upwardly at the outer end, as and for the purpose described.

EUGENE R. KNIGHT.

Witnesses:
N. H. SMITH,
BENTON HOLMAN.